3,478,240
BRUSH HOLDER AND INSERT AND METHOD OF ASSEMBLY
Robert Dennis Harris, Baltimore, Md., assignor to The Black and Decker Manufacturing Company, Towson, Md., a corporation of Maryland
Filed Jan. 24, 1968, Ser. No. 700,207
Int. Cl. H02k 5/14
U.S. Cl. 310—247
9 Claims

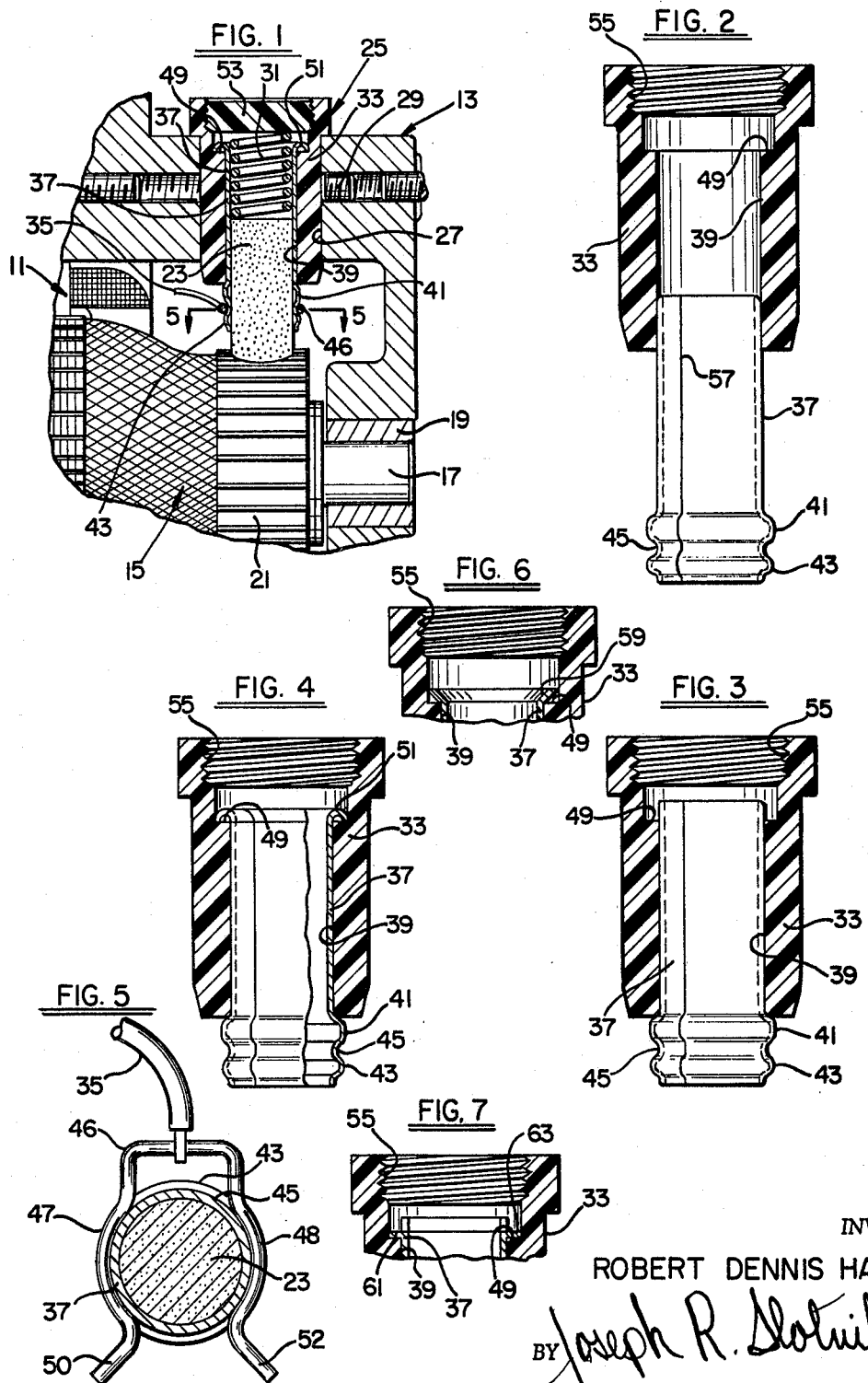
Nov. 11, 1969 R. D. HARRIS 3,478,240
BRUSH HOLDER AND INSERT AND METHOD OF ASSEMBLY
Filed Jan. 24, 1968
INVENTOR
ROBERT DENNIS HARRIS
BY Joseph R. Slotnik
ATTORNEY

United States Patent Office 3,478,240
Patented Nov. 11, 1969

ABSTRACT OF THE DISCLOSURE

The device disclosed herein is a brush holder construction which carries a carbon brush engageable with a commutator of an electric motor armature. The brush holder construction is supported by a motor frame and includes means to interconnect an electrical lead to the brush.

This invention relates generally to electric motors, and particularly to an improved brush holder construction and to the method of assembly thereof.

SUMMARY OF THE INVENTION

The present invention includes the method of assembly for and the structure of a brush holder body having a metallic sleeve therein slidably receiving a carbon brush. The sleeve has a pair of protuberances adjacent one end thereof, one of which locates the sleeve axially in the brush holder body and between which an electrical lead terminal is adapted to be retained. The other end of the sleeve is adapted to be deformed after assembly to the holder body and, together with said one protuberance, secures the sleeve in place within the holder body.

Main objects, therefore, of the present invention are to provide an improved brush holder construction which includes a brush holder body and a movable carbon brush, which construction embodies a novel electrical interconnection between the brush and its lead devoid of expensive or complicated connectors and which construction is adapted to be assembled inexpensively and in a novel manner.

Further objects of the present invention are to provide an improved brush holder construction of the above character, forming part of the brush assembly, which is rugged as well as a method of assembly thereof which may be performed beforehand so as not to disrupt or impede assembly of the motor.

Other objects and advantages of the present invention will become more apparent from a consideration of the detailed description to follow taken in conjunction with the drawings annexed hereto.

DESCRIPTION OF THE DRAWINGS

FIG. 1 is a fragmentary sectional view illustrating a brush holder construction formed in accordance with and embodying a preferred form of the present invention and shown in a typical electric motor installation;

FIG. 2 is a sectional view illustrating an initial assembly step for the brush holder construction;

FIG. 3 is a view, similar to FIG. 2, and showing the initial assembly step completed, i.e., the sleeve in place within the brush holder body;

FIG. 4 is a view similar to FIGS. 2 and 3 and illustrating the brush holder constructed fully assembled;

FIG. 5 is a sectional view of FIG. 1 taken along the line 5—5 thereof;

FIG. 6 is a fragmentary view similar to FIG. 4 but illustrating a modified form of the invention; and FIG. 7 is a fragmentary view similar to FIGS. 4 and 6 but illustrating still another form of the invention.

BROAD STATEMENT OF THE INVENTION

Broadly described, the present invention relates to a brush holder construction comprising a body having an opening therein, an elongated metallic sleeve disposed in said opening and extending outwardly of one end of said body, said metallic sleeve having protuberance means formed thereon adjacent one end thereof, said protuberance means being adapted to abut said body at said one end and locate said sleeve axially relatively thereto, said sleeve having its other end outwardly deformed and co-operating with said body, said sleeve other end and said protuberance means serving to securely retain said sleeve within said body.

In another aspect, the present invention relates to a brush holder construction comprising an insulation body having an opening therethrough, an elongated metallic sleeve disposed in said opening and having one end extending outwardly of one end of said body, said metallic sleeve having a generally annular groove adjacent said one end, an electrical terminal connected to said sleeve at said annular groove, said body having a counterbore adjacent its other end, said sleeve having its other end outwardly deformed and positioned in said counterbore to locate said sleeve axially within said body, and insulating means removably positioned in said counterbore behind said outwardly deformed end of said sleeve.

DETAILED DESCRIPTION

Refering now more specifically to the drawings, an electric motor employing a brush holder construction embodying, and assembled according to, the present invention is partially illustrated in FIG. 1 and is seen to include a stationary field 11 fixedly supported in a motor housing or frame 13 and having a rotatable armature 15 disposed therein. An armature shaft 17, forming part of the armature 15, has its ends supported by bearings 19 (only one of which is shown) also carried by the frame 13.

The armature 15 also includes a commutator 21 which rotates therewith and which is engaged by a pair of carbon brushes 23 (only one of which is shown). The brushes 23 are each carried by a brush holder construction 25 (only one of which is shown) adapted to extend through openings 27 in the motor frame 13 and secured in place therein by suitable means such as a set screw 29.

Electric current is transmitted to the armature 15 through the engaged brushes 23 and commutator 21, which are held so engaged by a compression spring 31 behind each of the brushes 23. Each brush holder construction 25 includes a brush holder body 33 which carries the brush 23 and the spring 31 and is seated in the frame opening 27. Each brush holder body 33 is preferably constructed using an electrical insulating material such as a phenolic and serves to insure that the motor frame 13 is electrically insulated and is not "hot". The brushes 23, on the other hand, are electrically connected each to an electric lead 35 (FIG. 5) and it is this particular construction, and the method of assembly thereof, which connects the leads 35 and the brushes 23, that the present invention pertains.

Turning now to a consideration of FIGS. 2–4, along with FIGS. 1 and 5, it will be seen that the carbon brush 23 is slidable in a metallic sleeve 37 which is fitted in an opening 39 in the brush holder body 33. The sleeve 37 preferably, but not necessarily, is formed of brass and has a pair of axially spaced protuberance means 41, 43 formed thereon adjacent one end thereof. In the illustrated embodiment, the sleeve 37 is circular in cross section and the protuberance means 41, 43 circumscribe the sleeve 37 and define an annular groove 45 therebetween. The electrical lead 35 has a metallic terminal 46 fixed thereto and which as shown in FIG. 5, has a pair of spring-like arms 47, 48 which are curved so as to snugly grip the sleeve 37 at the groove 45. The outer ends of the arms 47, 48 are bent away from each other forming fingers 50, 52, respectively, so that by pressing these fingers 50, 52 radially against the sleeve 37, at the groove 45, the terminal arms 47, 48 spread apart and snap into place in the groove 45 where it is retained by and between the protuberances 41, 43. It will be appreciated that the sleeve 37, and particularly the protuberance 43 thereof, is sufficiently stiff so as to prevent the terminal 46 from inadvertantly or accidentally pulling off during use. However, the terminal 47 can be pulled off, if desired, by pulling thereon in direction radially of the sleeve 37 and opposite to the direction of assembly.

As can be seen in FIGS. 1 and 4, the sleeve 37, when fully inserted in place in the brush holder body opening 39, is situated with the protuberance 41 seated against the end of the brush holder body 33. The inner end of the sleeve 37 extends past a generally radial shoulder 49 on the brush holder body 33. The inner end of the sleeve 37 is rolled over, as shown at 51, or otherwise outwardly deformed, so that it cooperates with the shoulder 49 to prevent the sleeve 37 from pulling out of the brush holder body opening 39. This rolled over portion 51 together with the protuberance 41, then, securely retains the sleeve 37 in place within the brush holder body 33. To permit the inner end of the sleeve 37 to be so rolled after insertion into the brush holder body 33, and to facilitate easy insertion and removal of the brush and spring 31 after the brush holder body 33 is in place within the frame opening 27, the brush holder body 33 has a removable end plug 53 threaded into an opening 55 in the outer end thereof.

To assemble the brush holder construction 25, the sleeve 37, with the protuberances 41, 43 already formed, is inserted into the brush holder body opening 39, as shown in FIG. 2. The sleeve 37, as described above, is preferably constructed of brass and is formed to the shape illustrated in FIG. 2 (circular in cross-section) and joined along a seam 57 by known swaging methods. Alternatively, the sleeve 37 could be formed by extrusion (circular or polygonal in cross-section depending on the desired shape of the brush holder body opening 39 and the brush 23 used therewith) or it could be first brazed along the seam 57 or the sleeve could first be formed and the protuberances 41, 43 added thereafter. Also, the sleeve 37 could be formed from other materials, e.g. stainless steel, in which case other forming techniques might apply.

In any event, the sleeve 37, after it is formed to the shape shown in FIG. 2, is inserted into the brush holder body opening 39 (which preferably but not necessarily is sized to receive the sleeve 37 in press fit relation) to substantially the position shown in FIG. 3. Here, the sleeve 37 extends slightly beyond the shoulder 49 and can be rolled over, as shown in FIG. 4, forming the lip 51 which seats against the shoulder 49 and, at the same time, holds the protuberance 41 against the end of the brush holder body 33. Alternatively, the end of the sleeve 37 which extends beyond the shoulder 49 could be flared outwardly as shown at 59 in FIG. 6, or tabs 61, 63 could be struck out therefrom as shown in FIG. 7, to lay against the shoulder 49 and retain the sleeve 37 within the brush holder body 33.

In all embodiments shown, the brush holder body 33 is open at its outer end, as shown at 55, for easy insertion and removal of the spring 31 and brush 23 so that the rolling over, flaring or otherwise shaping of the sleeve end toward the shoulder 49 is easily performed through this opening 55; however, it should be understood that this sleeve shaping could be performed from the other end of the brush holder body 33 by a tool inserted through the sleeve 37 should it be desired such as, for example, when the brush holder body 33 has no accessible opening 55.

After the brush holder body 33 and sleeve 37 are assembled, as shown in FIGS. 4, 6 and 7, the body 33 is inserted into the frame opening 27 and secured in place by the set screw 29. Thereafter, the lead terminal 46 is snapped on the sleeve 37, at the groove 45, the brush 23 and spring 31 dropped into place and the plug 53 threaded into the opening 55.

It will be appreciated, by those skilled in the art, that this brush holder construction can be preassembled to the point shown in FIG. 4 and that in the final motor assembly, the brush holder body 33 and assembled sleeve 37 need only be dropped into the frame opening 37, the screw 29 tightened, the brush 23 and spring 31 dropped in place, the plug 53 inserted and the terminal 46 snapped on. This construction, as well as the assembly thereof, is extremely simple and inexpensive and contains few parts, but is, at the same time, very efficient and reliable and is not subject to failure.

By the foregoing, there has been disclosed an improved brush holder construction and method of assembly therefor calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. A brush holder construction comprising a body having an opening therein, an elongated metallic sleeve disposed in said opening and extending outwardly of one end of said body, said metallic sleeve having protuberance means thereon adjacent one end thereof, said protuberance means being adapted to abut said body at said one end and locate said sleeve axially relative thereto, said sleeve having its other end outwardly deformed and cooperating with said body, said sleeve other end and said protuberance means serving to securely retain said sleeve within said body.

2. A construction as defined in claim 1 wherein said protuberance means includes a pair of protuberances spaced axially on said sleeve and adapted to retain an electrical lead terminal therebetween.

3. A construction as defined in claim 1 wherein said sleeve is press fitted within said body.

4. A construction as defined in claim 1 wherein said sleeve is constructed of brass.

5. A construction as defined in claim 1 wherein said sleeve other end is rolled over and cooperates with a shoulder on said body.

6. A construction as defined in claim 1 wherein said sleeve other end is flared outwardly and cooperates with a shoulder on said body.

7. A construction as defined in claim 1 wherein said sleeve other end has tab means bent outwardly thereof to cooperate with a shoulder on said body.

8. A construction as defined in claim 1 wherein said opening and said sleeve are circular in cross-section.

9. A brush holder construction comprising an insulating body having an opening therethrough, an elongated metallic sleeve disposed in said opening and having one end extending outwardly of one end of said body, said metallic sleeve having a generally annular groove adjacent said one end, an electrical terminal connected to said sleeve at said annular groove, said body having a counterbore adjacent its other end, said sleeve having its other end outwardly deformed and positioned in said counterbore to locate said sleeve axially within said body, and insulating means removably positioned in said counterbore behind said outwardly deformed end of said sleeve.

References Cited

UNITED STATES PATENTS

| | | | |
|---|---|---|---|
| 2,264,998 | 12/1941 | Miner | 310—247 |
| 2,695,968 | 11/1954 | Welch | 310—247 |
| 2,813,208 | 11/1957 | Ritter | 310—247 |
| 1,793,258 | 2/1931 | Smellie et al. | 310—247 |
| 2,454,909 | 11/1948 | Bylund | 310—247 |
| 2,477,352 | 7/1949 | Stark | 310—247 |

MILTON O. HIRSHFIELD, Primary Examiner

L. L. SMITH, Assistant Examiner

UNITED STATES PATENT OFFICE
CERTIFICATE OF CORRECTION

Patent No. 3,478,240    Dated  November 11, 1969

Inventor(s)  Robert Dennis Harris

It is certified that error appears in the above-identified patent and that said Letters Patent are hereby corrected as shown below:

Column 2, line 13, "relatively" should be ---relative---;

Column 2, line 19, "insulation" should read ---insulating--;

Column 3, line 22, "in direction" should read ---in a direction--;

Column 4, line 40, "mean thereon" should read ---means formed thereon--.

SIGNED AND
SEALED
SEP 29 1970

(SEAL)
Attest:

Edward M. Fletcher, Jr.
Attesting Officer

WILLIAM E. SCHUYLER, JR.
Commissioner of Patents